(12) United States Patent
Habermann (10) Patent No.: US 9,176,887 B2
(45) Date of Patent: Nov. 3, 2015

(54) COMPRESSED LEVEL TWO BLOCK BUFFER METADATA CACHE

(71) Applicant: Quantum Corporation, San Jose, CA (US)

(72) Inventor: Joseph Richard Habermann, Minneapolis, MN (US)

(*) Notice: Subject to any disclaimer, the term of this patent is extended or adjusted under 35 U.S.C. 154(b) by 158 days.

(21) Appl. No.: 14/147,564

(22) Filed: Jan. 5, 2014

(65) Prior Publication Data

US 2015/0193353 A1 Jul. 9, 2015

(51) Int. Cl.
*G06F 12/00* (2006.01)
*G06F 12/08* (2006.01)

(52) U.S. Cl.
CPC ........ *G06F 12/0897* (2013.01); *G06F 12/0802* (2013.01); *G06F 12/0811* (2013.01); *G06F 12/0848* (2013.01); *G06F 2212/283* (2013.01); *G06F 2212/401* (2013.01); *G06F 2212/466* (2013.01)

(58) Field of Classification Search
CPC ............ G06F 12/0802; G06F 12/0811; G06F 12/0848; G06F 2212/401; G06F 2212/466
See application file for complete search history.

(56) References Cited

U.S. PATENT DOCUMENTS 8,219,766 B1 * 7/2012 Orcutt ........................... 711/162
2007/0237405 A1 * 10/2007 Harada et al. ................. 382/232

* cited by examiner

*Primary Examiner* — Shawn X Gu (57) ABSTRACT

Example apparatus and methods provide metadata for a file system operation from a multi-level data store. The data store may include an in-memory level one (L1) cache, an in-memory level two (L2) cache, and an external metadata store not located in the memory associated with the L1 and L2 caches. The L1 cache stores metadata in a non-compressed format that can directly service a file system operation while the L2 cache stores metadata in a compressed format that cannot directly service an operation. Metadata to support a file system operation may be sought in the L1 cache first, then in the L2 cache, and then finally in the external metadata store. When metadata is provided from the L2 cache, it is decompressed before being provided to the L1 cache. Metadata added to the L2 cache may be compressed after or in parallel with being provided to the L1 cache.

18 Claims, 10 Drawing Sheets

COMPRESSED LEVEL TWO BLOCK BUFFER METADATA CACHE

BACKGROUND

File systems store files and store information about files. The information stored in files may be referred to as data. The information about files may be referred to as metadata. The metadata may include, for example, a file name, a file size, a file parent, a file descendant, a file access time, a file owner, file permissions, and other information. Some of the metadata for an individual file may be stored in a data structure known as an inode. The inodes and metadata for a file system may also be stored collectively. The metadata has both structure and content. When the data in a file or about a file changes, a file system may want to update the metadata about that file. For example, if the contents of a file are changed, the file system may want to memorialize the time at which the change was made and by whom the change was made. Actions on a file produce actions on a corresponding inode. To reduce delays caused by file system operations, a file system may store at least a part of the file system metadata in memory.

When file systems were small, the metadata associated with file systems was also relatively small and thus could be cached entirely in memory. However, as file systems expanded, and as file systems spread across multiple apparatus into distributed file systems, the metadata has grown. In some cases, the metadata for a file system may become so large that it is difficult, if even possible at all, to cache all the metadata in memory. Thus, some metadata may need to be stored on disk and brought into memory on an as-needed basis. Unfortunately, random input/output for metadata produces considerable, even unacceptable delays in file system processing. In particular, startup processing may consume an unacceptable amount of time. Additionally, failover time may also be compromised by having to deal with buffers that may require an unacceptable amount of time to pre-initialize on failover.

A desirable feature in a distributed file system is having fast failover between different apparatus in the distributed system. Failover depends, at least in part, on having metadata buffers available. However, having large metadata buffers that support storing large amounts of metadata in memory may compromise failover time due to the pre-initialization of the buffers required at startup time.

In an attempt to reduce the impact of storing metadata on disk, reductions in metadata sizes have been made. For example, the disk space used for metadata has been reduced by more efficient representations. One reduction has been achieved by placing the contents of small directories inside the inode directly instead of inside a separate block. Another reduction may involve supporting only a smaller (e.g., 4 KiB) file system block size. Earlier file systems may have used larger (e.g., 18 KiB, 64 KiB) file system block sizes that wasted space when only a small percentage of the block was used. While these reductions have reduced metadata size issues, the amount of metadata may still exceed the size of memory or caches dedicated to storing metadata.

As metadata reductions occur, it may become feasible to store metadata in memory. Storing metadata in memory improves performance of metadata operations that only require read operations (e.g., lookup). Storing metadata in memory may also improve performance of metadata operations that perform writes because contention for a disk on which metadata is stored may be reduced. Unfortunately, there may be unintended consequences of storing all metadata in memory.

Consider a configuration where there is an 8 GiB cache storing 4 KiB buffers. In this configuration there may be more than two million 4 KiB buffers to be initialized. The time required to initialize over two million 4 KiB buffers may delay file system manager activation. Also, pre-initializing over two million 4 KiB buffers may add time to failover processing. Additionally, while having a large number of small caches is useful for some situations (e.g., locality of access is above a threshold), having a large number of small caches may be unwieldy for certain actions (e.g., walking an entire file system during a file system scan). Thus, a balance between buffer size, cache size, and buffer processing may need to be struck.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Example apparatus and methods use a two tiered buffering approach for storing file system metadata. The two tiered buffering approach may include a level one (L1) cache and a level two (L2) cache. Buffers in the L1 cache may be pre-allocated at file system manager activation. The L2 cache may have buffers allocated as needed. Data stored in the L2 cache may be compressed to facilitate storing more metadata in memory. Compressing data stored in the L2 cache may facilitate storing all file system metadata in memory. While there is a time delay associated with compressing and decompressing data, the time delay may be less than the time delay associated with reading a block from disk into memory.

The L2 cache may logically reside between the L1 cache and, for example, a physical disk subsystem where metadata is stored. The L1 cache may be similar to a current buffer cache. Unlike the L1 cache, buffers for the L2 cache may only be allocated as needed instead of at file system manager (FSM) activation. Thus, FSM activation time may be reduced and failover time may be reduced.

In one embodiment, all the metadata may be read from disk to the L1 cache and the L2 cache using sequential input/output instead of random input/output. This may also reduce FSM activation time and failover time. Data in the L1 cache may not be compressed and data in the L2 cache may be compressed. A miss in the L1 cache may be satisfied from the L2 cache rather than from disk.

Once the metadata is initially read into the L2 cache and compressed, the metadata may then be read from the L2 cache to support misses in the L1 cache. Looked at another way, the data in the L2 cache will support read operations but will not support transactions. The L1 cache will support transactions (e.g., reads, writes). Therefore, overhead data (e.g., headers) for metadata stored in the L2 cache may be reduced by only storing information required for reading blocks without storing information for writing blocks.

Example apparatus and methods may have a user configurable buffer cache size. The total user configurable buffer cache size may be split between the L1 cache and the L2 cache. In one embodiment, if the total cache size is less than a threshold amount (e.g., 1 GiB), then only an L1 cache may be employed. If the total cache size is greater than the threshold amount, then both an L1 cache and an L2 cache may be employed. When the total cache size is greater than the threshold amount, then a certain amount of memory may be allocated for the L1 cache and the remaining memory may be allocated to the L2 cache. For example, the first 512 MiB may be allocated to the L1 cache and the remainder allocated to the L2 cache. The L1 cache may be required to have a certain minimum size because the L1 cache will be used to support transactions. If the L1 cache that is supporting transactions is too small, performance issues, deadlocks, or other undesired consequences may be encountered.

Data blocks may concurrently reside in both the L1 cache and the L2 cache. Therefore, the effective cache size, which measures the amount of raw metadata that can be in a cache, is equal to the maximum of the size of the L1 cache and the size of the data that can be decompressed from the L2 cache. By way of illustration, if a compression ratio of three to one is possible, then with a total of 1 GiB split into a 512 MiB L1 cache and a 512 MiB L2 cache, the effective cache size is 1.5 GiB. The 1.5 GiB is the maximum of the 512 MiB L1 cache and the 3*512 MiB stored in the L2 cache. Thus, in this example, when 1 GiB of memory is configured for the combination of the L1 and L2 caches, the effective size of the cache is 1.5 GiB. Not all combinations of L1 and L2 cache sizes will produce an effective cache size larger than the memory used, which would be wasteful and counter-productive. For example, if 600 MiB was allocated with 512 MiB for the L1 cache and 88 MiB for the L2 cache, then the effective cache size would be 512 MiB (because 88*3 only equals 264 MiB). Therefore, example apparatus and methods may selectively allocate different amounts of memory between the L1 and L2 caches to insure that the effective cache size is at least as big as the memory used for the caches.

Figure 1:
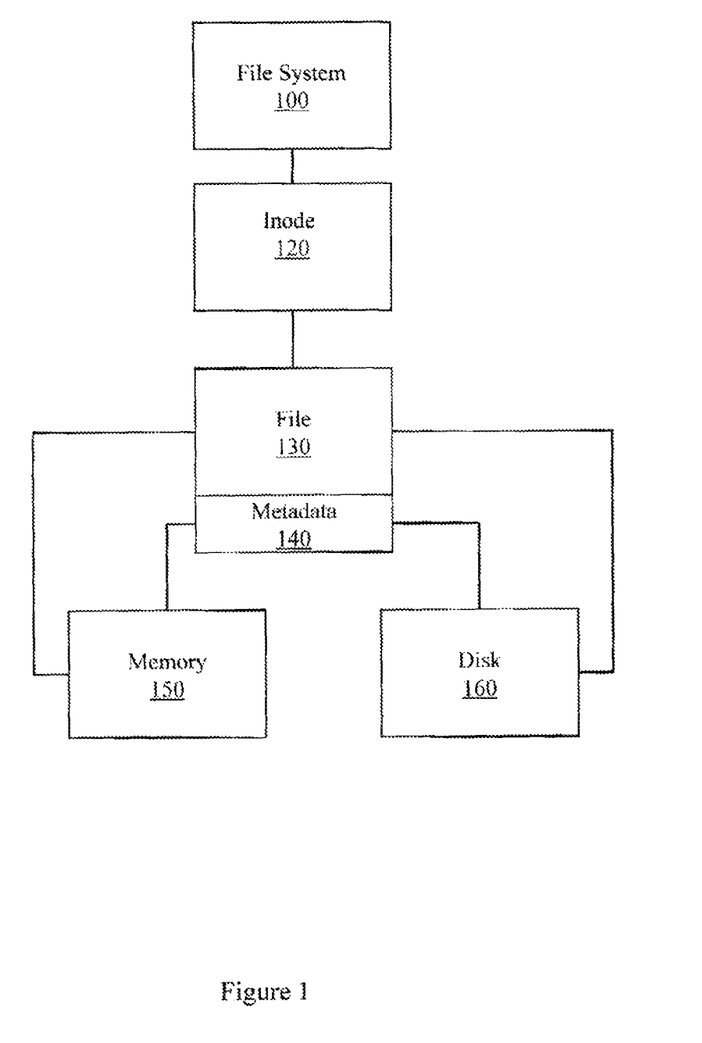
FIG. 1 illustrates a file system.

Figure one illustrates a file system 100. While a user may refer to a file 130 using a file name, the file system 100 may refer to the file 130 using an inode 120. When a change is made to the file 130, there may also be a change to the metadata 140 of the file. The metadata 140 may include, for example, the name of a file, the size of a file, the owner of a file, the most recent access time of a file, and other information. In some occurrences, the updated file 130 may be stored in memory 150. Similarly, in some occurrences, the updated metadata 140 may be stored in memory 150. Ultimately, the updated file 130 and the updated metadata 140 may be stored on disk 160. While there are changes that have been made only in memory 150, a journal may be used to protect those changes. In one embodiment, some of the metadata 140 for a file 130 may be stored in the inode 120 associated with the file. The inode 120 may also store association metadata (e.g., parent, child) for a file. The association metadata may describe, for example, a parent (e.g., directory) for a file or a descendant (e.g., sub-directory, file) for a directory. The inodes and metadata may be stored in data structures about the files. Thus, file system 100 may have both files and data structures about those files. As file systems become distributed and grow larger, the metadata may expand beyond the size of the available memory. Therefore, example apparatus and methods provide a two-tiered buffering approach for storing file system metadata.

Figure 2:
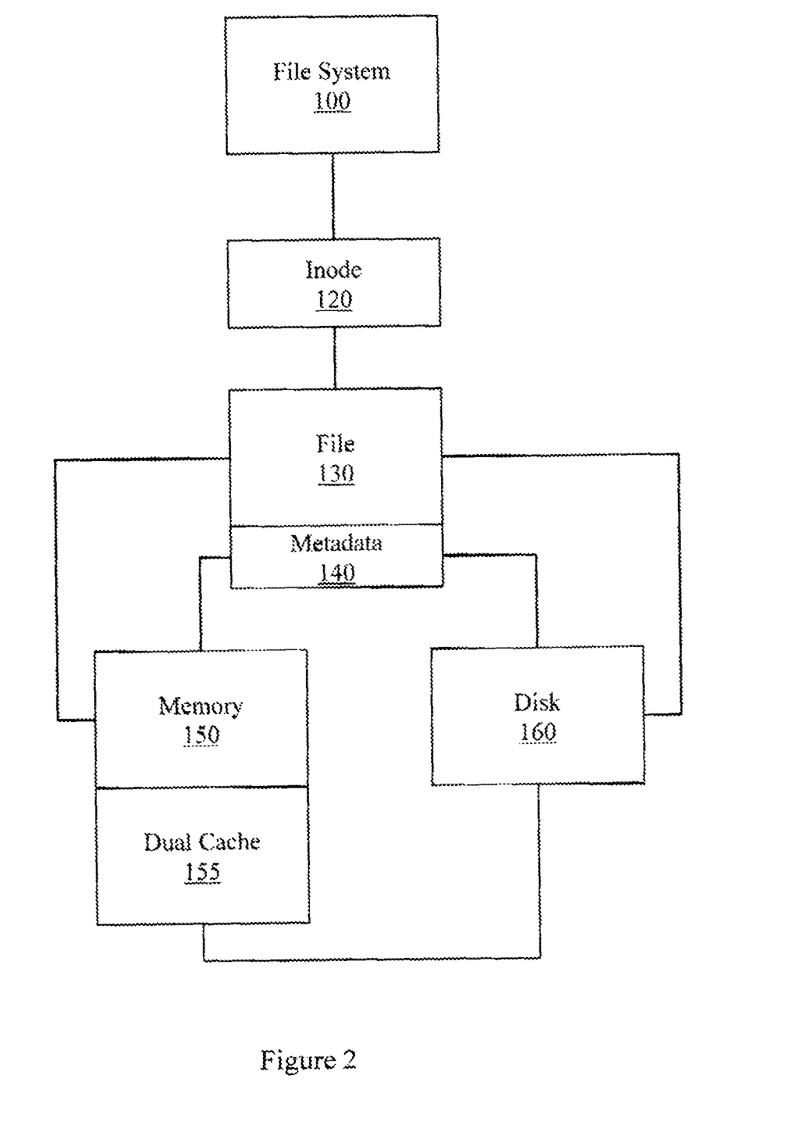
FIG. 2 illustrates a file system configured with a dual cache metadata system.

FIG. 2 illustrates the file system 100 where the memory 150 is configured with a dual cache 155. The dual cache 155 may be configured with a level one cache (L1) and a level two cache (L2). The L1 cache may support transactions. The L2 cache may not support transactions. Metadata in the L1 cache may not be compressed while metadata in the L2 cache may be compressed. Some metadata may be pre-positioned in the L1 cache while metadata may flow into the L2 cache on an as-needed basis. Misses in the L1 cache may be satisfied from the L2 cache if possible, and from the disk 160 if not possible.

Figure 3:
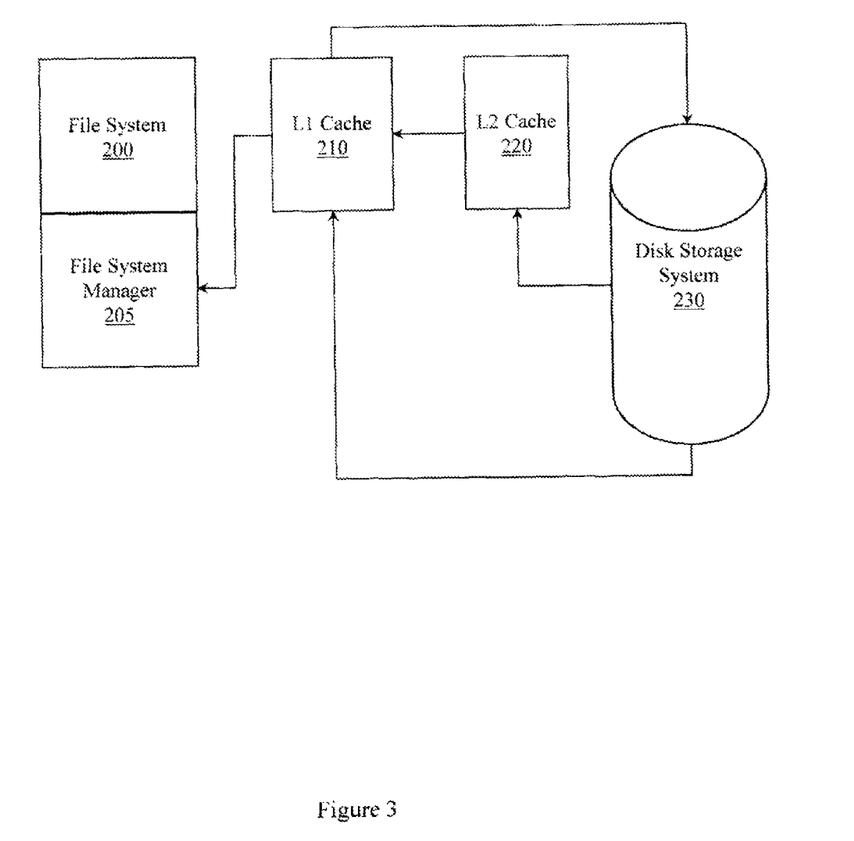
FIG. 3 illustrates an example compressed level-2 block buffer metadata cache operating as part of a metadata system.

FIG. 3 illustrates a file system 200, a file system manager (FSM) 205, an L1 cache 210, an L2 cache 220, and a disk storage system 230. While a disk storage system 230 is described, more generally a metadata store residing somewhere other than the memory used for the L1 cache 210 and the L2 cache 220 may be employed. The metadata store may reside in, for example, a disk, a redundant array of independent disks (RAID), a tape, a tape library, a storage area network (SAN), a solid state device (SSD), in the cloud, or in combinations thereof. The L1 cache 210 may service file system operations for the file system 200. The L1 cache may be readable by the file system 200 or FSM 205 and writeable by the file system 200 or FSM 205. In one embodiment, some metadata may initially be read into the L1 cache. Since not all the metadata may fit in the L1 cache 210, there may be read misses in the L1 cache 210. A read miss in the L1 cache 210 will cause the L2 cache 220 to be consulted before reading from the disk storage system 230. Initially, the L2 cache 220 may be empty. Recall that data in the L2 cache 220 is compressed. If the L2 cache 220 read produces a hit, the data may need to be decompressed before being provided to the L1 cache 210. Decompressing the data from the L2 cache 220 will take less time than doing a read from the disk storage system 230. If there is a miss in the L1 cache 210 and a miss in the L2 cache 220, then data will be read from the disk storage system 230. Performing the read from the disk storage system 230 will cause a buffer to be en-queued for placement in the L2 cache 220. In one embodiment, the L2 populating is not done in-line to prevent delays. For example, populating the L2 cache 220 could take up to hundreds of microseconds, which may undesirably increase the latency of metadata operations. Rather than populate the L2 cache 220 in-line, a separate thread or process may handle buffers to be placed in the L1 cache 210 and compressed and placed in the L2 cache 220.

Figure 4:
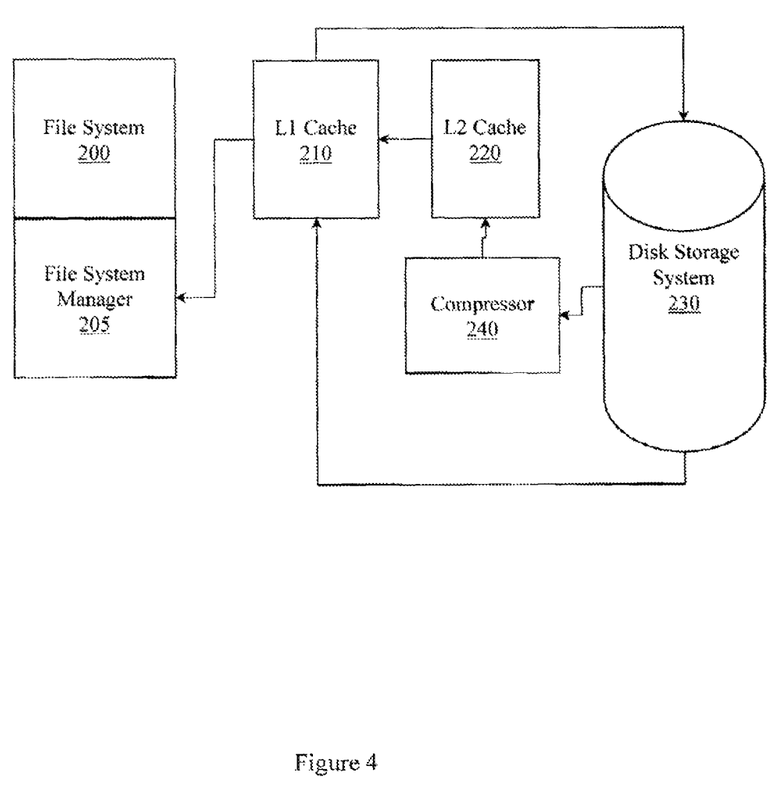
FIG. 4 illustrates an example compressed level-2 block buffer metadata cache operating as part of a metadata system.

FIG. 4 illustrates metadata flowing from the disk storage system 230 to the L2 cache 220 through a compressor 240. This embodiment may support system-wide operations like, for example, a file system check (fsck) operation that may want to touch (e.g., examine, analyze, access) all the metadata for the file system 200. Similarly, a file system repair may want to touch all the metadata for the file system 200. In this embodiment, rather than the L2 cache 220 being built from misses in the L1 cache 210 and flushes of dirty buffers from the L1 cache 210, both the L1 cache and the L2 cache may be populated using synchronous reads from the disk storage system 230. Reading the entire set of metadata using synchronous reads may be more efficient for large operations like an fsck than doing a large number of random input/outputs from the disk storage system 230.

Figure 5:
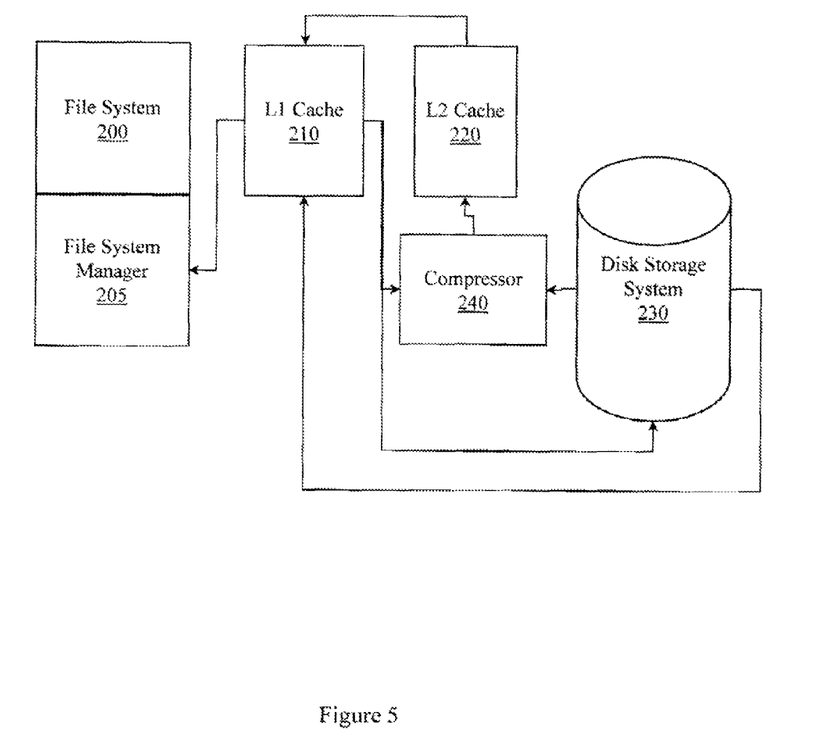
FIG. 5 illustrates an example compressed level-2 block buffer metadata cache operating as part of a metadata system.

FIG. 5 illustrates processing associated with flushing a dirty L1 buffer to disk storage system 230. Flushing the dirty L1 buffer will cause the buffer to be en-queued for compressing by the compressor 240 and placement in the L2 cache 220. If the dirty buffer resides in the L1 cache 210 and a read-only copy resides in the L2 cache 220, then the copy in the L2 cache 220 will be invalidated. Metadata in the L2 cache 220 may be used for read-only operations. Therefore, the L2 cache 220 may never include a "dirty" (e.g., updated) buffer compared to the metadata stored on disk and as a result there may be no flushes of dirty buffers in the L2 cache 220.

Some portions of the detailed descriptions herein are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated. The physical manipulations create a concrete, tangible, useful, real-world result.

It has proven convenient at times, principally for reasons of common usage, to refer to these signals as bits, values, elements, symbols, characters, terms, or numbers. It should be borne in mind, however, that these and similar terms are to be associated with the appropriate physical quantities and are merely convenient labels applied to these quantities. Unless specifically stated otherwise, it is to be appreciated that throughout the description, terms including processing, computing, and determining refer to actions and processes of a computer system, logic, processor, or similar electronic device that manipulates and transforms data represented as physical (electronic) quantities.

Example methods may be better appreciated with reference to flow diagrams. For purposes of simplicity of explanation, the illustrated methodologies are shown and described as a series of blocks. However, it is to be appreciated that the methodologies are not limited by the order of the blocks, as some blocks can occur in different orders or concurrently with other blocks from that shown and described. Moreover, less than all the illustrated blocks may be required to implement an example methodology. Blocks may be combined or separated into multiple components. Furthermore, additional or alternative methodologies can employ additional, not illustrated blocks.

Figure 6:
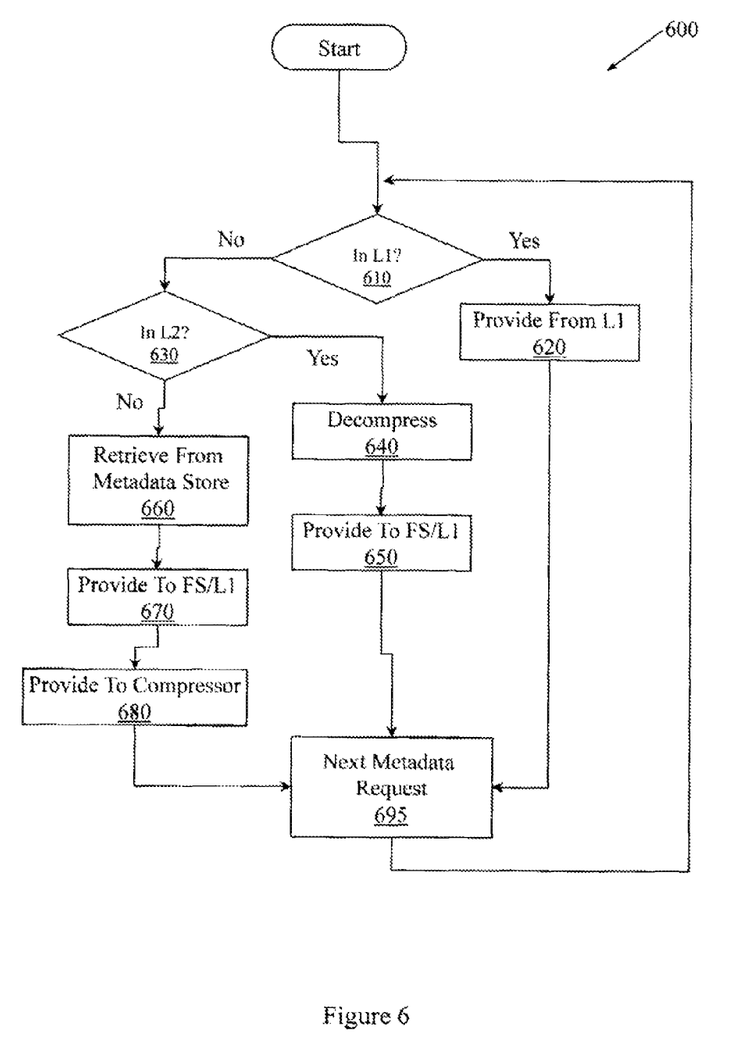
FIG. 6 illustrates an example method associated with performing compressed level-2 block buffer metadata caching.

FIG. 6 illustrates a method 600 associated with performing compressed level two block buffer metadata caching. Performing compressed level two block buffer metadata caching may include providing metadata for a file system operation from a three level data store. The three level data store may include a level one metadata cache stored in a memory, a level two metadata cache stored in the memory, and a metadata store not stored in the memory. In different embodiments, the metadata store may be located, for example, on a disk, a tape, a storage area network, a solid state device, in the cloud, or in a collection of co-operating devices. Metadata may be stored differently in different locations in the three level data store. For example, the level one metadata cache stores metadata in a non-compressed format that can directly service a file system operation, and the level two metadata cache stores metadata in a compressed format that cannot directly service a file system operation.

In one embodiment, metadata stored in the level one cache is associated with a transactional header and metadata stored in the level two cache is associated with a read header. The transactional header facilitates reading from and writing to the level one cache. The read header only supports reading metadata from the level two cache. The read header is smaller than the transactional header. In one embodiment, the transactional header may be based, at least in part, on directly servicing file system operations.

Method 600 includes, at 610, determining whether the metadata for the file system operation is located in the level one metadata cache. Upon determining that the metadata is located in the level one metadata cache, method 600 proceeds at 620 by providing the metadata to the file system from the level one metadata cache. Upon determining that the metadata is not located in the level one cache, method 600 proceeds, at 630, to determine whether the metadata for the file system operation is located in the level two metadata cache.

Upon determining that the metadata is located in the level two metadata cache, method 600 proceeds, at 640, to decompress the metadata. Once the metadata has been decompressed, method 600 proceeds, at 650, to provide the metadata to the level one metadata cache, and to provide the metadata to the file system.

Upon determining that the metadata is not located in the level two metadata cache, method 600 proceeds, at 660, to retrieve the metadata from the metadata store. Once the metadata has been retrieved from the metadata store, method 600 proceeds, at 670, to provide the metadata to the level one metadata cache and to the file system.

Method 600 also includes, at 680, providing the metadata retrieved from the metadata store to a compressor process. The compressor process is configured to compress the metadata into compressed metadata and to store the compressed metadata in the level two metadata cache. Rather than delay file system operations by waiting for compression to complete, in one embodiment, the compressor process is configured to compress the metadata into compressed metadata after providing the metadata to the level one cache. In one embodiment, the compressor process is a separate process configured to operate in parallel with the file system operation. Method 600 may then proceed, at 695, to handle the next metadata request by, for example, returning to 610.

Figure 7:
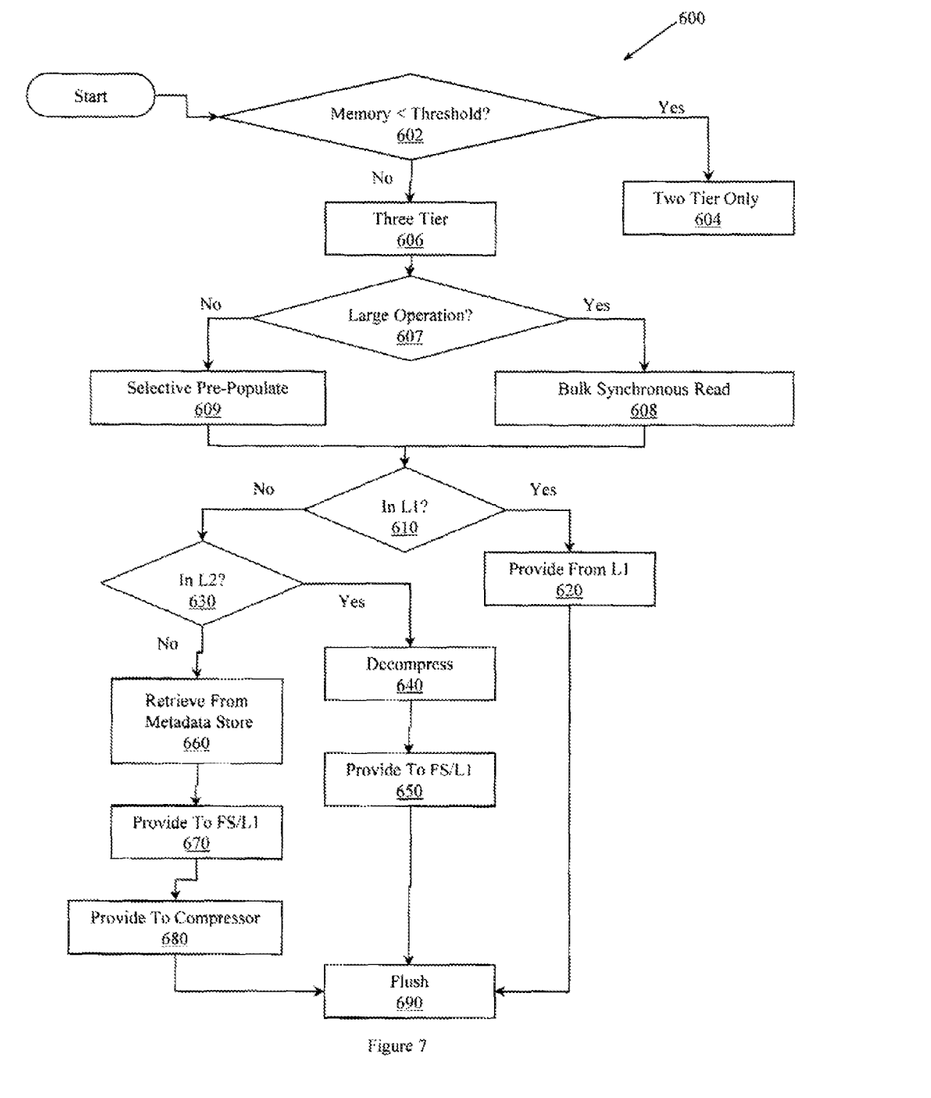
FIG. 7 illustrates an example method associated with performing compressed level-2 block buffer metadata caching.

FIG. 7 illustrates another embodiment of method 600 (FIG. 6). This embodiment of method 600 includes a preliminary action of determining whether the three level data store will actually have three levels or will only have two levels. Therefore, this embodiment includes, at 602, determining whether an effective size of a combination of the level one metadata cache and the level two metadata cache is less than an amount of memory allocated for the level one metadata cache and level two metadata cache. Recall that the effective size of the combination is equal to the maximum of the size of the level one metadata cache and the size of the data that can be decompressed from the level two metadata cache. If the determination at 602 is yes, then method 600 proceeds, at 604, to configure the three level data store to include just the in-memory level one metadata cache and the non-memory based metadata store. If the determination at 602 is no, then method 600 proceeds, at 606, to configure the three level data store to include the in-memory level one metadata cache, the in-memory level two metadata cache, and the non-memory based metadata store.

Over time, as data is read from the level one cache and written to the level one cache, a buffer in the level one cache may become dirty. "Dirty" refers to the metadata in the buffer in cache not being identical to the corresponding metadata stored in more permanent storage for the file system. When a buffer is dirty, the buffer may be flushed. Therefore method 600 may also include, at 690, upon flushing a dirty buffer from the level one metadata cache, selectively invalidating a buffer in the level two metadata cache corresponding to the dirty buffer. Flushing the dirty buffer at 690 may also include providing the dirty buffer to the compressor process and controlling the compressor process to compress the dirty buffer into a compressed buffer and to place the compressed buffer in the level two metadata cache.

Some file system operations may act on individual pieces of metadata. Other file system operations may operate on large collections of metadata, and in some cases, may touch all the metadata for a file system. Therefore, method 600 may also include, at 607, determining whether a file system operation will touch more than a threshold amount (e.g., 50%, 90%, 99%) of the metadata for a file system. Upon determining that a file system operation will touch more than a threshold amount of the file system metadata, method 600 may proceed, at 608, to fill the level one cache and the level two cache to a fill threshold from the metadata store using sequential input/output. The file system operation may be, for example, a file system check, a file system repair, a failover, or other bulk operation.

In one embodiment, method 600 may include, at 609, selectively pre-populating the level one metadata cache with a portion of the metadata stored in the metadata store before allowing the three level data store to provide metadata to service the file system operation.

In one example, a method may be implemented as computer executable instructions. Thus, in one example, a computer-readable medium may store computer executable instructions that if executed by a machine (e.g., processor) cause the machine to perform method 600. While executable instructions associated with method 600 are described as being stored on a computer-readable medium, it is to be appreciated that executable instructions associated with other example methods described herein may also be stored on a computer-readable medium.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and other similar terms, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
RAM: random access memory.
DRAM: dynamic RAM.
SRAM: synchronous RAM.
ROM: read only memory.
PROM: programmable ROM.
SSD: solid state drive
SAN: storage area network.
USB: universal serial bus.
WAN: wide area network.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer-readable medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and other disks. Volatile media may include, for example, semiconductor memories, dynamic memory, and other memories. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Data stare", as used herein, refers to a physical and/or logical entity that can store data. A data store may be, for example, a database, a table, a file, a data structure (e.g. a list, a queue, a heap, a tree) a memory, a register, or other repository. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include, for example, a software controlled microprocessor, a discrete logic (e.g., ASIC), an analog circuit, a digital circuit, a programmed logic device, or a memory device containing instructions. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, or logical communications may be sent or received. An operable connection may include a physical interface, an electrical interface, or a data interface. An operable connection may include differing combinations of interfaces or connections sufficient to allow operable control. For example, two entities can be operably connected to communicate signals to each other directly or through one or more intermediate entities (e.g., processor, operating system, logic, software). Logical or physical communication channels can be used to create an operable connection.

"Signal", as used herein, includes but is not limited to, electrical signals, optical signals, analog signals, digital signals, data, computer instructions, processor instructions, messages, a bit, or a bit stream, that can be received, transmitted and/or detected.

"Software", as used herein, includes but is not limited to, one or more executable instructions that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, or programs including separate applications or code from dynamically linked libraries.

"User", as used herein, includes but is not limited to one or more persons, software, logics, applications, computers or other devices, or combinations of these.

Figure 8:
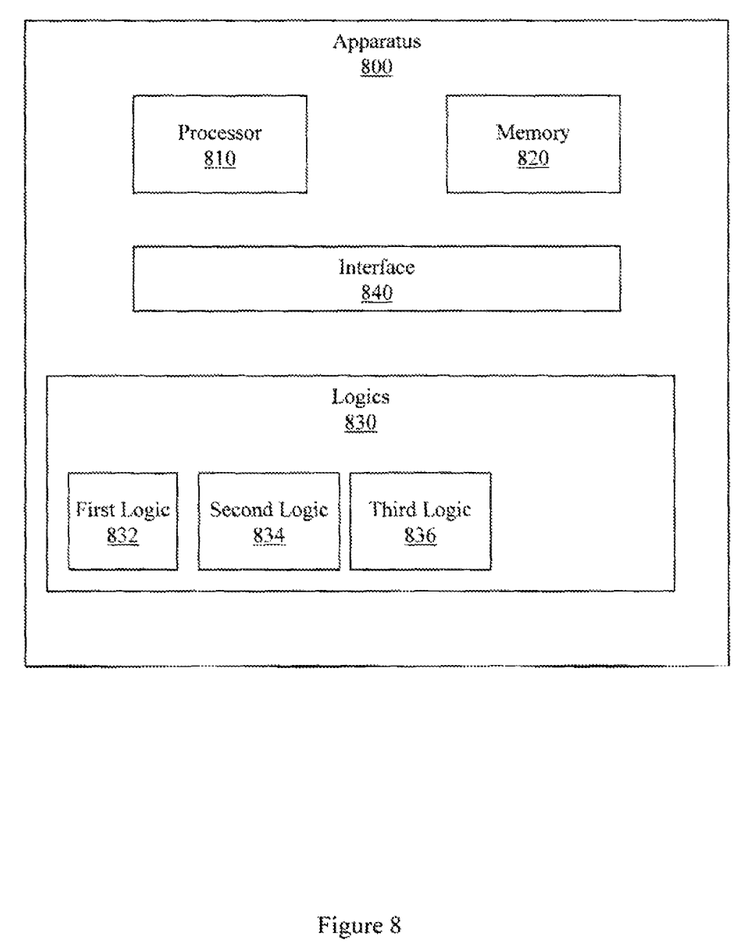
FIG. 8 illustrates an example apparatus configured to perform compressed level-2 block buffer metadata cache.

FIG. 8 illustrates an apparatus 800 that supports compressed level two block buffer metadata caching. Apparatus 800 includes a processor 810, a memory 820, and a set 830 of logics that is connected to the processor 810 and memory 820 by an interface 840. The memory 820 may be configured to store metadata for a file system in an L1 cache and an L2 cache. The set 830 of logics may be configured to provide metadata for a file system operation.

The set 830 of logics may include a first logic 832 that is configured to manage a first cache (L1) located in the memory 820. The metadata stored in the first cache is not compressed. In one embodiment, the first logic 832 is configured to associate a transactional header with a set of metadata in the first cache. The transactional header facilitates providing the set of metadata to the file system to support the operation and facilitates both reading from and writing to the first cache. For example, the transactional header may have been designed in light of the file system to which metadata is being provided and may have fields from which the file system can read directly without translation or conversion.

The apparatus 800 may also include a second logic 834 that is configured to manage a second cache (L2). The second cache is also located in the memory 820. However, unlike the metadata stored in the first cache, the metadata stored in the second cache is compressed. Thus, metadata in the second cache may require decompression before being useful to the file system. While decompressing metadata in the second cache may take some time, the amount of time required to decompress metadata in memory 820 may be significantly less than the amount of time that would be required to acquire metadata from an external device (e.g., disk).

In one embodiment, the second logic 834 is configured to associate a non-transactional header with a set of metadata in the second cache. The non-transactional header facilitates providing the set of metadata from the second cache to the first cache but does not support providing data directly to the file system. Also, the non-transactional header does not facilitate updating data in the second cache. Thus, data in the second cache may be read-only. The non-transactional header is smaller than the transactional header which facilitates reducing the amount of memory needed to store metadata in the second cache, which in turn increases the overall amount of metadata that may be stored in memory.

In one embodiment, the first logic 832 and the second logic 834 are configured to control the size of the first cache and the size of the second cache. The control is based on the size of the memory 820 and on an effective cache size that is achievable. The effective cache size is the maximum of the non-compressed metadata in the first cache and the size of the metadata that can be decompressed from the compressed metadata in the second cache. As described above, some combinations of first cache size and second cache size may be counter-productive. Therefore, in one embodiment, the first logic 832 and the second logic 834 are configured to only produce memory allocations and cache configurations that produce net gains in metadata stored in memory 820.

The apparatus 800 may also include a third logic 836 that is configured to provide metadata for a file system operation. In one embodiment, the third logic 836 is configured to provide metadata for the file system operation from the first cache when the metadata is available from the first cache. If the metadata is not available in the first cache, which may be referred to as an L1 cache miss, the third logic 836 is configured to provide metadata from the second cache. If the metadata is also not available in the second cache, which may be referred to as an L2 cache miss, the third logic 838 is configured to provide metadata from an external source. The external source may be, for example, a disk, a collection of distributed disks, a tape, a collection of tapes, the cloud, or other apparatus.

Since data in L1 is not compressed while data in L2 is compressed, in one embodiment, the third logic 836 is configured to provide the metadata directly from the first cache, and to provide the metadata from the second cache after decompressing the metadata.

There are different types of file system operations that can be performed. Some operations act on a single file or inode, some operations operate on a small collection of files or inodes, and some operations operate on all or a large number of files or inodes in the file system. When an operation that will operate on all or a large number of files is detected, the first logic 832 and the second logic 834 may selectively populate, in bulk, the first cache and the second cache with metadata from outside the apparatus using sequential input/output. Operations that act on large numbers of files include, for example, a file system check, a file system repair, or a failover. Other operations may also be supported by bulk sequential input/output.

Figure 9:
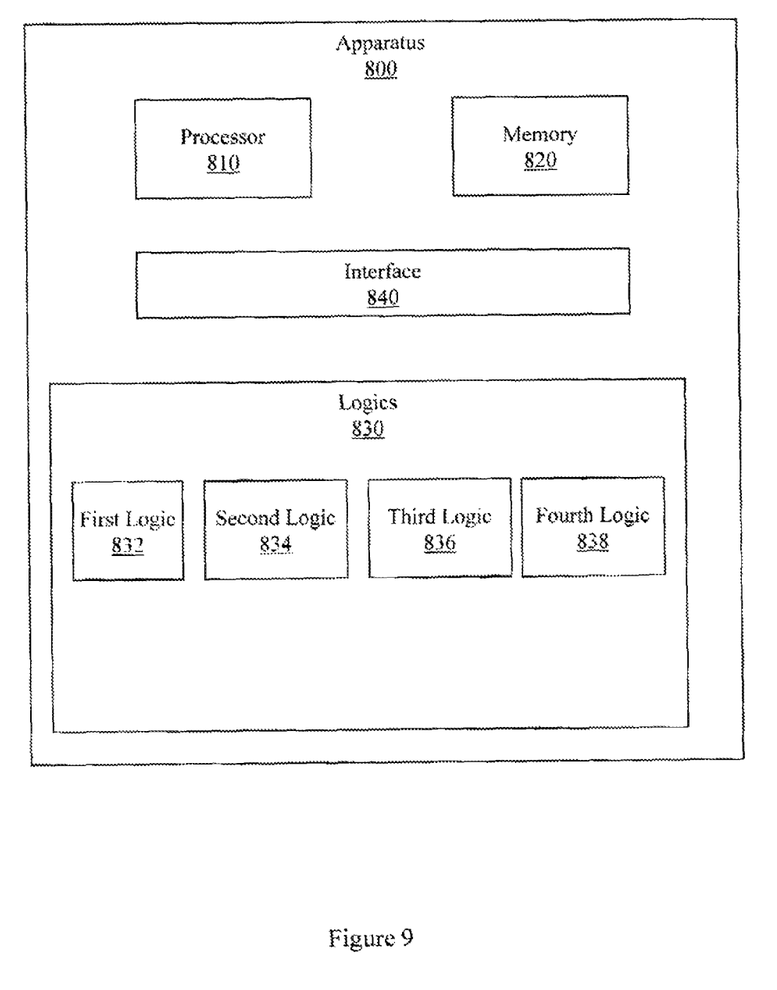
FIG. 9 illustrates an example apparatus configured to perform compressed level-2 block buffer metadata cache.

FIG. 9 illustrates another embodiment of apparatus 800. This embodiment includes a fourth logic 838. The fourth logic 838 may be configured to compress metadata into compressed metadata and to provide the compressed metadata to the second logic 834. In one embodiment, when the third logic 838 determines that metadata is not available in the first cache or the second cache and is being provided from the external source, the third logic 836 may provide the metadata to the fourth logic 838 for compression and addition to the second cache. The third logic 836 may also provide the metadata to the first logic 832 for addition to the first cache and may also provide the metadata to the file system operation. To mitigate delays associated with populating buffers and performing compression, the third logic 836 may provide the metadata to the fourth logic 838 after providing the metadata for the operation or in parallel with providing the metadata for the operation.

In one embodiment, the first logic 832 is configured to selectively flush a dirty buffer from the first cache. Flushing the dirty buffer may include updating the second cache. Thus, flushing the dirty buffer may include providing the dirty buffer to the fourth logic 838 for compression into a compressed buffer and controlling the second logic 834 to add the compressed buffer to the second cache. If a copy of the dirty buffer was already present in the second cache, then flushing the dirty buffer may also include controlling the second logic 834 to invalidate that buffer in the second cache that corresponds to the dirty buffer.

Figure 10:
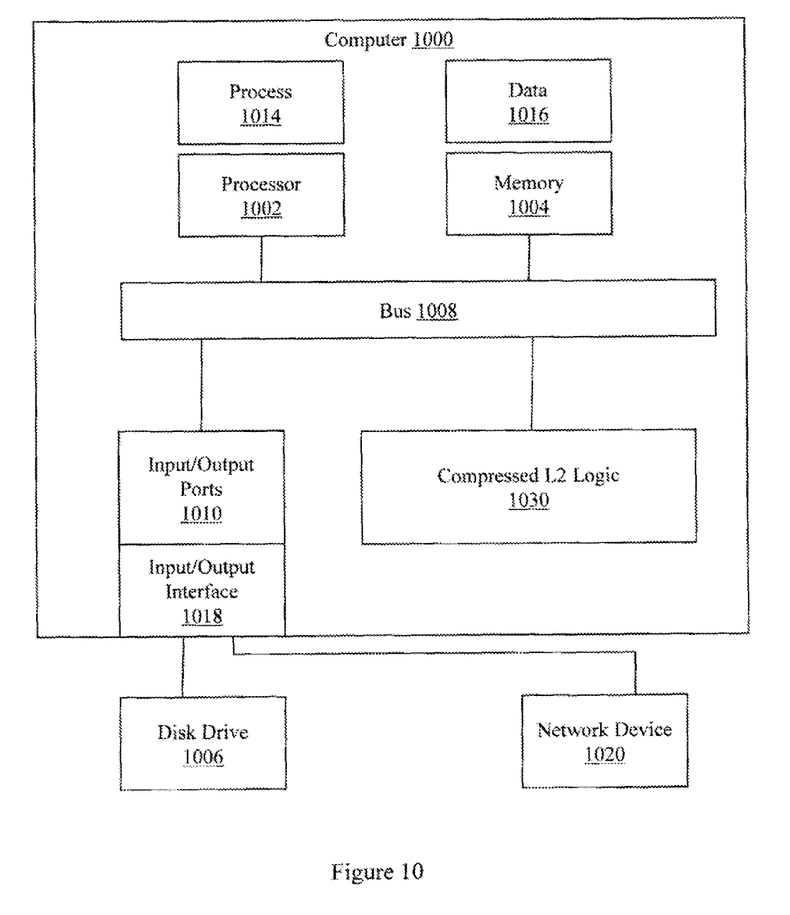
FIG. 10 illustrates an example apparatus configured to perform compressed level-2 block buffer metadata cache.

FIG. 10 illustrates an example computing device in which example systems and methods described herein, and equivalents, may operate. The example computing device may be a computer 1000 that includes a processor 1002, a memory 1004, and input/output ports 1010 operably connected by a bus 1008. In one example, the computer 1000 may include a compressed L2 cache logic 1030 configured to process file system metadata using a two-tiered approach. In different examples, the logic 1030 may be implemented in hardware, software, firmware, and/or combinations thereof. While the logic 1030 is illustrated as a hardware component attached to the bus 1008, it is to be appreciated that in one example, the logic 1030 could be implemented in the processor 1002.

Logic 1030 may provide means (e.g., hardware, software, firmware) for storing non-compressed metadata in a first portion of memory 1004 when computer 1000 is an apparatus that provides metadata for a file system. The non-compressed metadata may be stored using headers and in a format that optimizes metadata retrieval for supporting a file system operation. Logic 1030 may also provide means for storing compressed metadata in a second portion of the memory 1004. The compressed metadata may be stored using different headers and in a format that optimizes metadata retrieval for supporting a miss in the first portion of the memory 1004. Logic 1030 may also provide means (e.g., hardware, software, firmware) for providing non-compressed metadata to support a file system action using a hierarchical approach. The hierarchical approach may attempt to provide the metadata to support the file system action from the non-compressed metadata first. If the metadata is not available in the first portion of the memory 1004, then the hierarchical approach may access the compressed metadata in the second portion of the memory 1004, decompress the compressed metadata, and provide the decompressed metadata to the file system and to the first portion of the memory 1004. Thus, the first portion may be populated from the second portion after a miss in the first portion. Logic 1030 may also provide means for acquiring metadata from a source external to the memory 1004. The external source may be consulted when the metadata was found in neither the first portion nor the second portion. The external source may be, for example, disk 1006, network device 1020, or another device. Logic 1030 may also provide means for compressing metadata acquired from the source external to the memory 1004 in parallel with providing the metadata to the first portion of the memory 1004 and providing the metadata to support the file system action. Rather than compressing the metadata from the external source first, the metadata may be compressed in parallel or even after being provided to the first portion and to the file system operation to mitigate delays associated with compressing the metadata.

The means associated with logic 1030 may be implemented, for example, as an ASIC that implements the functionality of apparatus described herein. The means may also be implemented as computer executable instructions that implement the functionality of methods described herein and that are presented to computer 1000 as data 1016 that are temporarily stored in memory 1004 and then executed by processor 1002.

Generally describing an example configuration of the computer 1000, the processor 1002 may be a variety of various processors including dual microprocessor and other multi-processor architectures. A memory 1004 may include volatile memory and/or non-volatile memory. Non-volatile memory may include, for example, ROM, PROM, and other memory. Volatile memory may include, for example, RAM, SRAM, DRAM, and other memory.

A disk 1006 may be operably connected to the computer 1000 via, for example, an input/output interface (e.g., card, device) 1018 and an input/output port 1010. The disk 1006 may be, for example, a magnetic disk drive, a solid state disk drive, a floppy disk drive, a tape drive, a Zip drive, a flash memory card, a memory stick, or other device. The disk 1006 may be a CD-ROM drive, a CD-R drive, a CD-RW drive, a DVD ROM drive, a Blu-Ray drive, an HD-DVD drive, or other device. The memory 1004 can store a process 1014 and/or a data 1016, for example. The disk 1006 and/or the memory 1004 can store an operating system that controls and allocates resources of the computer 1000.

The bus 1008 may be a single internal bus interconnect architecture and/or other bus or mesh architectures. While a single bus is illustrated, it is to be appreciated that the computer 1000 may communicate with various devices, logics, and peripherals using other busses (e.g., PCIE, 1394, USB, Ethernet). The bus 1008 can be types including, for example, a memory bus, a memory controller, a peripheral bus, an external bus, a crossbar switch, and/or a local bus.

The computer 1000 may interact with input/output devices via the i/o interfaces 1018 and the input/output ports 1010. Input/output devices may be, for example, a keyboard, a microphone, a pointing and selection device, cameras, video cards, displays, the disk 1006, the network devices 1020, and other devices. The input/output ports 1010 may include, for example, serial ports, parallel ports, and USB ports.

The computer 1000 can operate in a network environment and thus may be connected to the network devices 1020 via the i/o interfaces 1018, and/or the i/o ports 1010. Through the network devices 1020, the computer 1000 may interact with a network. Through the network, the computer 1000 may be logically connected to remote computers. Networks with which the computer 1000 may interact include, but are not limited to, a LAN, a WAN, and other networks.

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes or Including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A non-transitory computer-readable medium storing computer-executable instructions that when executed by a computer cause the computer to perform a method, the method comprising:
    providing metadata for a file system operation from a three level data store,
    the three level data store comprising:
        a level one metadata cache stored in a memory;
        a level two metadata cache stored in the memory; and
        a metadata store not stored in the memory,
        where the level one metadata cache stores metadata in a non-compressed format that can directly service the file system operation,
        where the level two metadata cache stores metadata in a compressed format that cannot directly service the file system operation, and
        where providing metadata for the file system operation includes:
            upon determining that metadata is located in the level one metadata cache, providing metadata to the file system from the level one metadata cache, and
            upon determining that metadata is not located in the level one cache;
                upon determining that metadata is located in the level two metadata cache,
                    decompressing metadata,
                    providing metadata to the level one metadata cache, and
                    providing metadata to the file system,
                and
                upon determining that metadata is not located in the level two metadata cache,
                    retrieving metadata from the metadata store,
                    providing metadata to the level one metadata cache, and
                    providing metadata to the file system.

2. The non-transitory computer-readable medium of claim 1, the method comprising:
    upon retrieving metadata from the metadata store, providing metadata to a compressor process configured to compress metadata into compressed metadata and to store the compressed metadata in the level two metadata cache.

3. The non-transitory computer-readable medium of claim 2, where the compressor process is configured to compress metadata into compressed metadata after providing metadata to the level one cache.

4. The non-transitory computer-readable medium of claim 3, where the compressor process is a separate process configured to operate in parallel with the file system operation.

5. The non-transitory computer-readable medium of claim 3, the method comprising:
    upon flushing a dirty buffer from the level one metadata cache,
    selectively invalidating a buffer in the level two metadata cache corresponding to the dirty buffer, or
    providing the dirty buffer to the compressor process and controlling the compressor process to compress the dirty buffer into a compressed buffer and to place the compressed buffer in the level two metadata cache.

6. The non-transitory computer-readable medium of claim 1, the method comprising:
    upon determining that an effective size of a combination of the level one metadata cache and the level two metadata cache is less than an amount of memory allocated for the level one metadata cache and level two metadata cache,
    configuring the three level data store to include just the in-memory level one metadata cache and the metadata store, where the effective size of the combination is equal to the maximum of a size of the level one metadata cache and a size of a data that can be decompressed from the level two metadata cache.

7. The non-transitory computer-readable medium of claim 1, the method comprising:
    upon determining that an effective size of a combination of the level one metadata cache and level two metadata cache is more than an amount of memory allocated for the level one metadata cache and level two metadata cache,
    configuring the three level data store to include the in-memory level one metadata cache, the in-memory level two metadata cache, and the metadata store, where the effective size of the combination is equal to the maximum of a size of the level one metadata cache and a size of a data that can be decompressed from the level two metadata cache.

8. The non-transitory computer-readable medium of claim 1, where the metadata store is located on a disk, a tape, a storage area network, in a cloud storage, or on a solid state device.

9. The non-transitory computer-readable medium of claim 1, the method comprising pre-populating the level one metadata cache with a portion of metadata stored in the metadata store before allowing the three level data store to provide metadata to service the file system operation.

10. The non-transitory computer-readable medium of claim 1, comprising:
    upon determining that a file system operation will touch more than a threshold amount of file system metadata, filling the level one cache and the level two cache to a fill threshold from the metadata store using sequential input/output.

11. The non-transitory computer-readable medium of claim 1, where metadata stored in the level one cache is associated with a transactional header having a first size and metadata stored in the level two cache is associated with a read header having a second size, where the second size is less than the first size, and where the transactional header facilitates reading from and writing to the level one cache.

12. An apparatus, comprising:
    a processor;
    a memory configured to store metadata for a file system;
    a set of logics; and
    an interface that connects the processor, the memory, and the set of logics;
    the set of logics being configured to provide metadata for an operation performed by the file system, the set of logics comprising:
        a first logic configured to manage a first cache, where the first cache is located in the memory, and where metadata stored in the first cache is not compressed;
        a second logic configured to manage a second cache, where the second cache is located in the memory, and where metadata stored in the second cache is compressed, and
        a third logic configured to provide metadata for the operation, where the third logic is configured:
            to provide metadata for the operation from the first cache when metadata is available from the first cache,
            to provide metadata from the second cache when metadata is available from the second cache but not from the first cache, and to provide metadata from an external source when metadata is not available in the second cache and is not available in the first cache.

13. The apparatus of claim 12, where the third logic is configured:
to provide metadata directly from the first cache, and
to provide metadata from the second cache after decompressing metadata.

14. The apparatus of claim 13, comprising a fourth logic configured to compress metadata into compressed metadata and to provide the compressed metadata to the second logic,
where the third logic, upon determining that metadata is not available in the first cache or the second cache and is being provided from the external source:
provides metadata to the fourth logic for compression and addition to the second cache,
provides metadata to the first logic for addition to the first cache, and
provides metadata to the operation, and
where the third logic provides metadata to the fourth logic after providing metadata for the operation or in parallel with providing metadata for the operation.

15. The apparatus of claim 14, where the first logic is configured to selectively flush a dirty buffer from the first cache, where flushing the dirty buffer from the first cache includes:
providing the dirty buffer to the fourth logic for compression into a compressed buffer,
controlling the second logic to add the compressed buffer to the second cache, and
controlling the second logic to invalidate a buffer in the second cache that corresponds to the dirty buffer.

16. The apparatus of claim 15, where the first logic is configured to associate a transactional header with a set of metadata in the first cache, where the transactional header facilitates providing the set of metadata to the file system to support the operation, and
where the second logic is configured to associate a non-transactional header with a set of metadata in the second cache, where the non-transactional header facilitates providing the set of metadata from the second cache to the first cache, and where the transactional header is bigger than the non-transactional header.

17. The apparatus of claim 16, where the first logic and the second logic are configured to control a size of the first cache and a size of the second cache based on a size of the memory and on an effective cache size, where the effective cache size is the maximum of non-compressed metadata in the first cache and a size of metadata that can be decompressed from compressed metadata in the second cache.

18. The apparatus of claim 17, where the first logic and the second logic are configured to selectively populate, in bulk, the first cache and the second cache with metadata from outside the apparatus using sequential input/output.

* * * * *